United States Patent
Perry (10) Patent No.: US 12,221,082 B2
(45) Date of Patent: Feb. 11, 2025

(54) BRAKE MASTER CYLINDER

(71) Applicant: Andrew James Perry, Palmdale, CA (US)

(72) Inventor: Andrew James Perry, Palmdale, CA (US)

( * ) Notice: Subject to any disclaimer, the term of this patent is extended or adjusted under 35 U.S.C. 154(b) by 450 days.

(21) Appl. No.: 17/846,590

(22) Filed: Jun. 22, 2022

(65) Prior Publication Data

US 2022/0314948 A1  Oct. 6, 2022

Related U.S. Application Data

(63) Continuation-in-part of application No. 16/888,867, filed on Jun. 1, 2020, now Pat. No. 11,383,687.

(60) Provisional application No. 62/857,654, filed on Jun. 5, 2019.

(51) Int. Cl.
| | |
|---|---|
| B60T 11/22 | (2006.01) |
| B60T 17/06 | (2006.01) |
| B62K 19/38 | (2006.01) |
| B62L 3/02 | (2006.01) |
| B62M 25/08 | (2006.01) |

(52) U.S. Cl.
CPC .............. *B60T 11/22* (2013.01); *B60T 17/06* (2013.01); *B62K 19/38* (2013.01); *B62L 3/023* (2013.01); *B62M 25/08* (2013.01)

(58) Field of Classification Search
CPC ........ B60T 11/22; B60T 17/06; B60T 11/323; B60T 7/102; B62K 23/06; B62K 19/38; B62L 3/023; B62M 25/08
USPC ........................................................ 188/344
See application file for complete search history.

(56) References Cited

U.S. PATENT DOCUMENTS

| | | | | |
|---|---|---|---|---|
| 5,636,518 A | * | 6/1997 | Burgoyne | B62K 23/02 60/594 |
| 6,883,647 B1 | | 4/2005 | Wen | |
| 8,408,090 B2 | * | 4/2013 | Weiher | B62K 23/06 188/24.11 |
| 2005/0199450 A1 | * | 9/2005 | Campbell | B60T 11/22 188/24.15 |
| 2006/0071542 A1 | | 4/2006 | Lichtensteiger et al. | |
| 2008/0044253 A1 | * | 2/2008 | Esposito | G05G 23/00 74/519 |

(Continued)

FOREIGN PATENT DOCUMENTS

| | | | | |
|---|---|---|---|---|
| EP | | 893337 A2 * | 1/1999 | ............. B62K 23/06 |
| JP | 2008126989 A | * | 6/2008 | |

*Primary Examiner* — Robert A. Siconolfi
*Assistant Examiner* — San M Aung
(74) *Attorney, Agent, or Firm* — Nolan Heimann LLP; Adam Diament (57) ABSTRACT

A brake assembly includes a reservoir body adapted to store a brake fluid and defining a cylinder bore, and a piston adapted to reciprocate inside the cylinder bore. The brake assembly also includes a base bracket pivotably coupled to a reservoir body and adapted to be mounted to a handlebar, and a handle pivotally coupled to the base bracket and adapted to pivot relative to the base bracket. A drive link is pivotable coupled to the reservoir body and is configured to pivot relative to the reservoir body to advance the piston inside the cylinder bore in response to the pressing of the handle. The handle is configured to be set at a plurality of angular positions with respect to the reservoir body by pivoting the base bracket relative to the reservoir body.

12 Claims, 10 Drawing Sheets

(56) References Cited

U.S. PATENT DOCUMENTS

| | | | |
|---|---|---|---|
| 2009/0152062 A1* | 6/2009 | Tsai | B60T 17/04 |
| | | | 188/344 |
| 2013/0025988 A1* | 1/2013 | Moore | B62L 3/023 |
| | | | 188/344 |
| 2013/0069355 A1 | 3/2013 | Gohr et al. | |
| 2013/0192941 A1 | 8/2013 | Lin | |
| 2015/0266540 A1* | 9/2015 | Snead | B62L 3/023 |
| | | | 188/344 |
| 2016/0368560 A1* | 12/2016 | Barnett | B60T 7/102 |
| 2017/0106939 A1* | 4/2017 | Snead | B62L 1/005 |
| 2018/0354579 A1* | 12/2018 | Barnett | B62L 3/023 |
| 2019/0061870 A1* | 2/2019 | Sakai | B60T 11/16 |

* cited by examiner

SECTION A-A

BRAKE MASTER CYLINDER

CROSS-REFERENCE TO RELATED APPLICATIONS

This application is a Continuation-in-Part of U.S. application Ser. No. 16/888,867, filed Jun. 1, 2020, to Perry, which claims benefit of U.S. Provisional Patent Application No. 62/857,654, filed Jun. 5, 2019, the contents of each are incorporated by reference in their entireties.

FIELD OF THE DISCLOSURE

The present invention relates to brake assembly, and more specifically, to a brake assembly for a motorcycle having a reservoir body that stays level regardless of a positioning of a handle/lever of the brake assembly relative to a handlebar of the motorcycle.

BACKGROUND OF THE INVENTION

Brake actuation assembly for front braking on motorcycles are mounted on the handlebars. For a motorcycle, the brake fluid reservoir of the brake actuation assembly is on top of the handlebars. But some people like to ride with the handle/lever for actuating the brakes at a different angle, to grip it differently. Changes in the angular position of the handle also causes the tilting of the reservoir body holding the brake fluid relative to the ground, allowing the air to enter the housing of the piston from the reservoir body. This results into a loss of fluid pressure, which is undesirable.

The invention prevents air from entering a hydraulic piston brake line. The invention prevents air from entering brake lines by allowing the adjustment of the angular position of the handle relative to the reservoir body.

BRIEF SUMMARY OF THE PRESENT INVENTION

The present invention provides a brake assembly adapted to be mounted to a handlebar of a vehicle. The brake assembly includes a reservoir body adapted to store a brake fluid and defines a cylinder bore, and a piston adapted to reciprocate inside the cylinder bore. The brake assembly further includes a base bracket pivotably coupled to the reservoir body and adapted to be mounted to the handlebar, and a handle pivotally coupled to the base bracket and adapted to pivot relative to the base bracket. Moreover, the brake assembly includes a drive link pivotably coupled to the reservoir body and configured to pivot relative to the reservoir body to advance the piston inside the cylindrical bore in response to the pressing of the handle. The handle is configured to be set at a plurality of angular positions with respect to the reservoir body by pivoting the base bracket relative to the reservoir body.

In one aspect, the base bracket includes an arcuate slot to facilitate the setting of the handle at the plurality of angular positions.

In some embodiments, the reservoir body defines a mating groove and the brake assembly includes a screw extending inside the mating groove through the arcuate slot to set the handle at one of the plurality of angular positions.

In another aspect, the reservoir body includes a gear wheel portion having a plurality of teeth. The brake assembly also includes an actuator mounted to the base bracket and having a worm gear engaged with the gear wheel portion to facilitate the pivoting of the base bracket relative to the reservoir body to set the handle the plurality of angular positions.

In some embodiments, the actuator includes a motor, and the worm gear is connected to the motor and rotates in response to an actuation of the motor to facilitate the setting of the handle in any of the plurality of angular positions relative to the reservoir body.

According to an aspect, the reservoir body includes an extension arm, and the base bracket includes an arm pivotably coupled to the extension arm.

In some embodiments, the drive link includes a convex surface adapted to contact the piston, and a round surface arranged opposite to the convex surface and adapted to contact the handle. The convex surface and the round surface together facilitate the advancement of the piston inside the cylindrical bore in response to the pressing of the handle at any of the plurality of angular positions of the handle relative to the reservoir body.

In one aspect, the reservoir body includes a pair of brackets extending outwardly of a first lateral end of the reservoir body. The drive link is arranged between the pair of brackets and is pivotally coupled to the pair of brackets.

According to an aspect, the drive link includes a vertically extending body portion having a first longitudinal end and a second longitudinal end, and an arm portion extending from the body portion and arranged proximate to the second longitudinal end of the body. The handle is adapted to contact the arm and the first longitudinal end is pivotally coupled to the pair of brackets.

In one aspect, the handle is configured to advance the drive link in each of the plurality of angular positions of the handle relative to the reservoir body.

In some embodiments, the brake assembly further includes a cover bracket adapted to engage with the base bracket to facilitate the mounting of the base bracket to the handlebar.

In an aspect, the base bracket and the cover bracket together define a handlebar slot and the handlebar extends through the handlebar slot in the engagement of the brake assembly with the handlebar.

DETAILED DESCRIPTION OF EMBODIMENTS

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the FIGS.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

Figure 1:
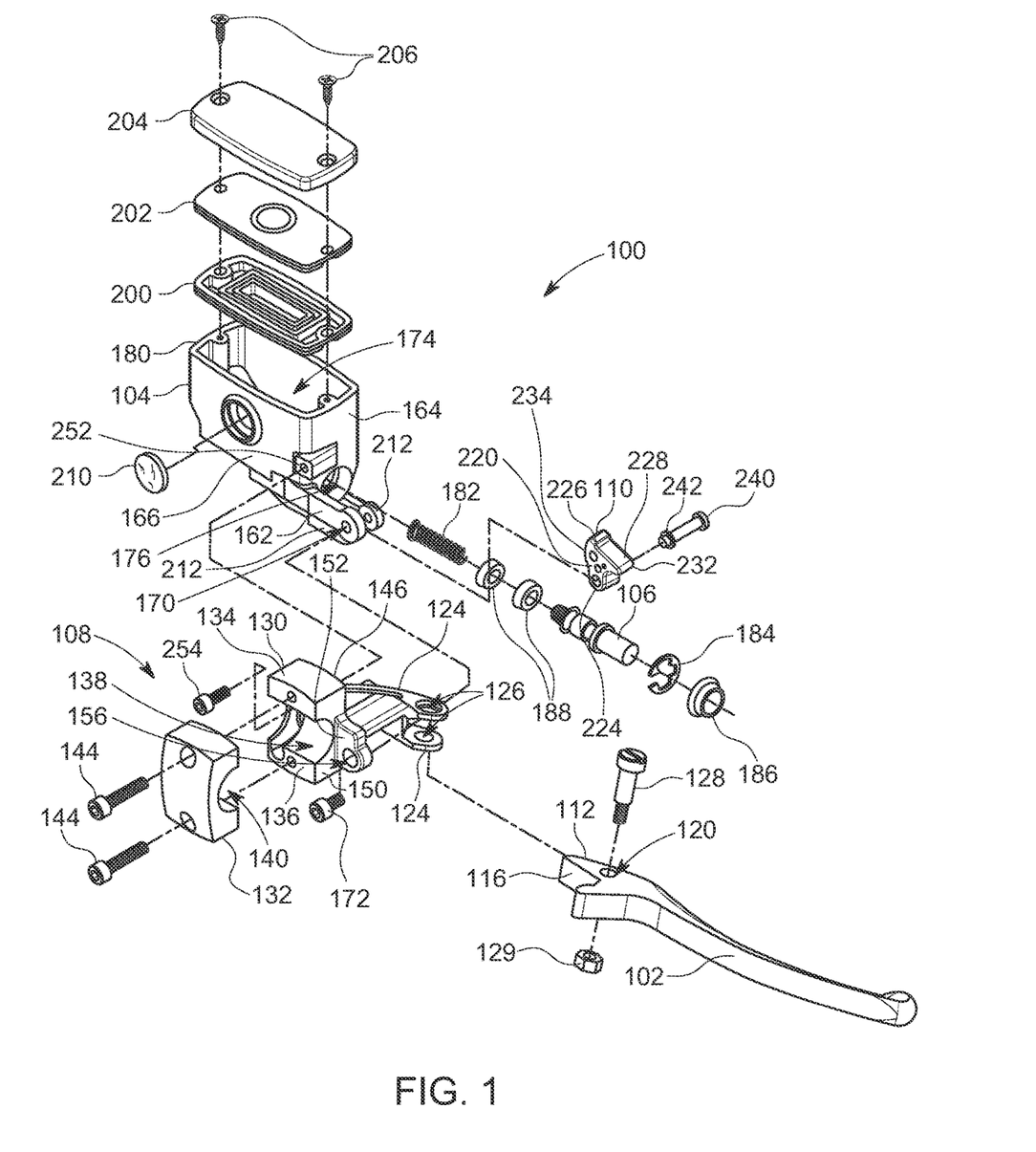
FIG. 1 illustrates an exploded perspective view of a brake assembly, according to an embodiment of the disclosure.
Figure 2:
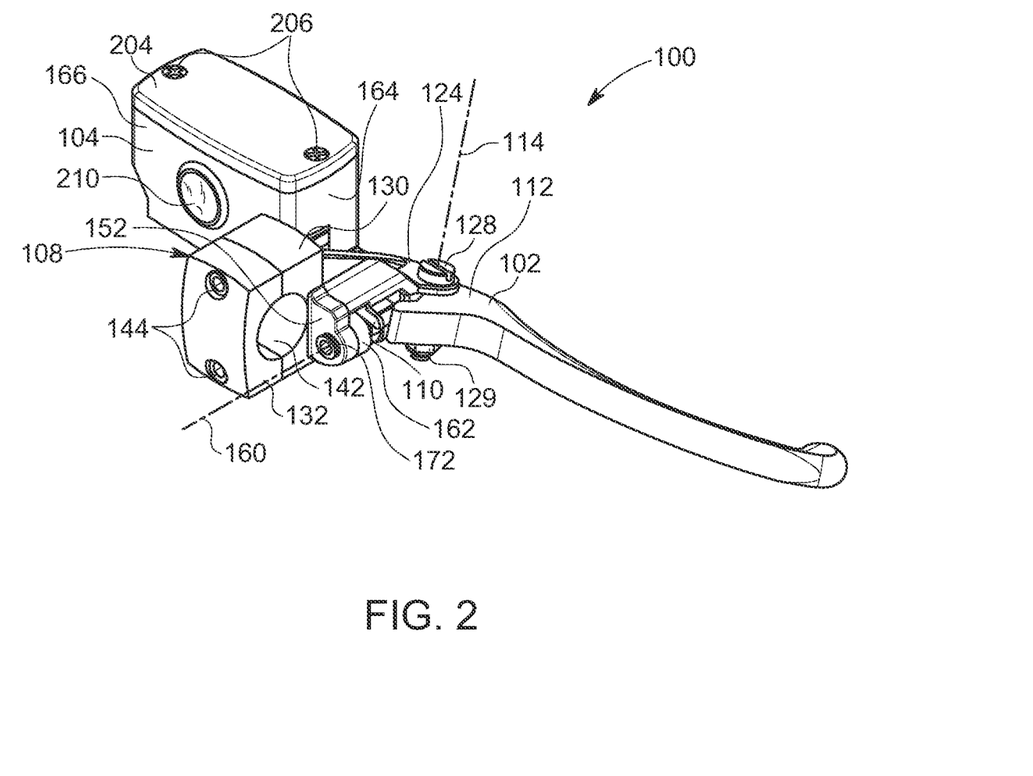
FIG. 2 illustrates an isometric front view of the brake assembly having a reservoir body traditionally aligned with a handle of the brake assembly, according to an embodiment of the disclosure.
Figure 8:
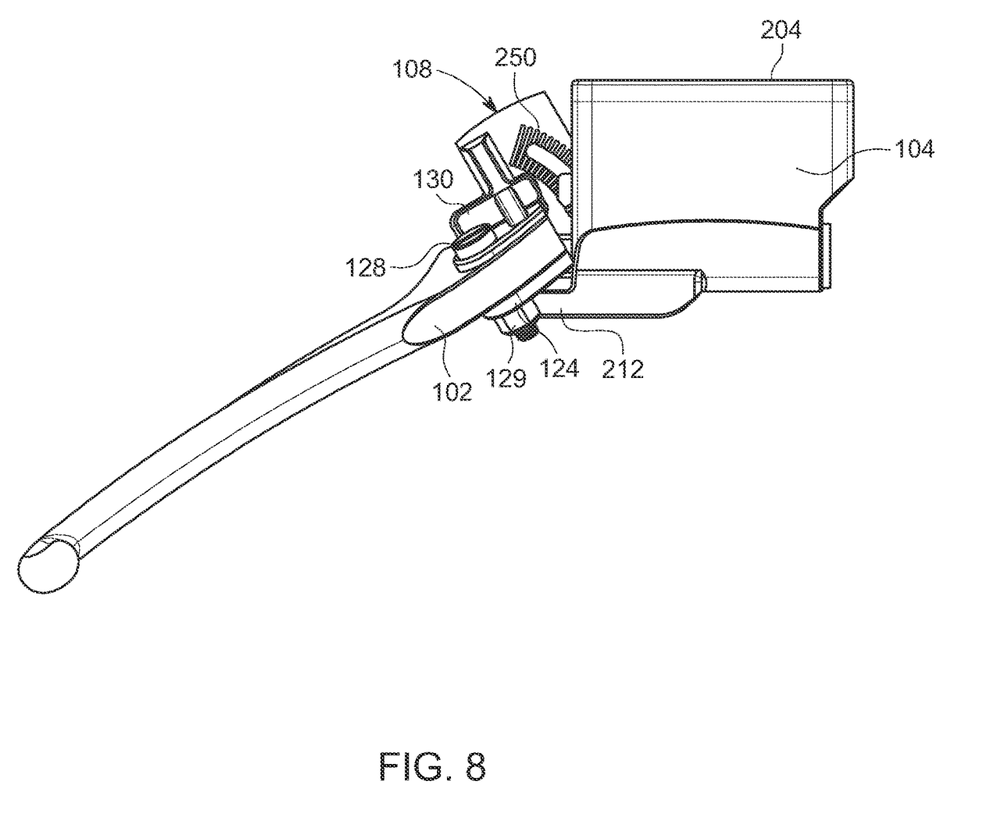
FIG. 8 illustrates a rear view of the brake master cylinder assembly, according to an embodiment of the disclosure.

Referring to FIGS. 1 and 8, a brake assembly 100 adapted to be mounted to a handlebar of a two wheeled vehicle, for example, a saddle riding vehicle is shown. The brake assembly 100 includes a handle 102 adapted to be operated/pressed by a rider of the vehicle to apply brakes, a reservoir body 104 for holding a brake fluid that flows to the brake of the vehicle to facilitate a braking of the vehicle upon pressing of the handle 102, a piston 106 arranged inside the reservoir body 104 and adapted to reciprocate inside the reservoir body 104 to enable a flow of fluid from the reservoir body 104 to the brake, a bracket assembly 108 configured to mount the brake assembly 100 to the handlebar, and a drive link 110 pivotally attached/coupled to the reservoir body 104 and arranged in contact with the piston 106 to push the piston 106 inside the reservoir body 104 in response to the pressing of the handle 102.

As shown, the handle 102 includes a first end 112 pivotally engaged to the bracket assembly 108 and adapted to pivot about a first axis 114. To pivotally attach the handle 102 and the bracket assembly 108, a yoke portion 116 of the handle 102 at the first end 112 defines a hole 120 and the bracket assembly 108 includes a pair of forks 124 having aligned openings 126. In the assembly of the handle 102 with the bracket assembly 108, the yoke portion 116 is arranged inside a space between the forks 124 such that the hole 120 aligns with the aligned openings 126, and a shoulder screw 128 extends through the openings 126 and the hole 120. In this manner, the handle 102 is arranged to pivot about the first axis 114 that aligns with a central axis of the shoulder screw 128. The shoulder screw 128 is secured with the forks 124 and the yoke portion 116 via a locking nut 129.

As shown, the bracket assembly 108 includes a base bracket 130 and a cover bracket 132 removably engaged to the base bracket 130 to enable the mounting of the bracket assembly 108 to the handlebar. The base bracket 130 includes a body 134 having a first surface 136 defining a first C shaped groove 138, and the cover bracket 132 defines a second C shaped groove 140 that faces the first C shaped groove 138 when assembled with the base bracket 130 to define a handlebar slot 142 through which the handlebar extends. The base bracket 130 and the cover bracket 132 may be coupled to each other via a pair of fasteners, for example, cover bracket machine screws 144.

Further, the base bracket 130 includes the pair of forks 124 extending outwardly from a second surface 146 disposed opposite to the first surface 136. As shown, the pair of forks 124 extends rearwardly and obliquely to the second surface 146, and the ends of the forks 124 are arranged outwardly and at a distance from a first lateral end 150 of the body 134. Further the forks 124 are arranged such that central axes of the openings 126 extends substantially perpendicularly to the central axis of the first groove 138 of the bracket assembly 108. Further, the base bracket 130 includes an arm 152 extending outwardly from the first lateral end 150 in a direction substantially parallel to the central axis of the slot 142. The arm 152 defines a through hole 156 having a central axis 160 that is substantially perpendicular to the central axis of the openings 126 and the central axis of the slot 142. The through hole 156 facilitates a rotational/pivotal coupling of the base bracket 130 with the reservoir body 104, and the base bracket 130 along with the handle 102 is adapted to rotate/pivot axis about the central axis 160 relative to the reservoir body 104. Accordingly, the handle 102 may set at a plurality of angular positions relative to the reservoir body 104 by rotating/pivoting the base bracket 130 about the axis 160.

To enable the rotational/pivotable coupling of the base bracket 130 with the reservoir body 104, the reservoir body 104 includes an extension arm 162 extending outwardly of a first lateral end 164 of a wall 166 of the reservoir body 104. The extension arm 162 defines a groove 170 that aligns with the through hole 156 of the arm 152 of the base bracket 130. The arm 152 and the extension arm 162 are rotatably/pivotably coupled via a screw 172. Further, the reservoir body 104 defines a chamber 174 (i.e., hydraulic brake fluid reservoir 174) for storing the brake fluid and a cylindrical bore 176 arranged proximate to a bottom end 178 of the reservoir body 104 and extending from the first lateral end 164 towards a second lateral end 180 of the reservoir body 104. It may be appreciated that an end of the piston 106 is arranged inside the cylindrical bore 176, while a second end of the piston 106 is arranged outside the reservoir body 104 and is disposed in contact the drive link 110. Further, the first end of the piston 106 is configured to move towards the second lateral end 180 of the reservoir body 104 in response to the pressing/actuation of the handle 102.

The piston 106 moves towards the first lateral end 164 due to a biasing force applied by a biasing member, for example, a compression spring 182, on the piston 106 upon removal of the force on the handle 102. The piston 106 is held in position inside the cylindrical bore 176 and with the reservoir body 104 by a retaining ring 184. Further, a seal 186 is arranged inside the cylindrical bore 176 and proximate to the first lateral end 164 of the reservoir body 104 to prevent debris from entering inside the cylindrical bore during the linear movement of the piston 106. Additionally, two compression gaskets 188 are mounted on the piston 106. One of the compression gaskets 188 is arranged proximate to the first end of the piston 106, and other of the compression gaskets is arranged proximate to the second end of the piston 106. To assembly the piston 106 with the reservoir body, the compression gaskets 188 and the spring 182 are fitted on the piston 106, and then assembly is arranged inside the cylindrical bore 176. The piston is held in place inside the bore 176 by the retaining ring 184.

Additionally, the reservoir body 104 defines a forward hydraulic fluid Orifice 190 and an aft hydraulic fluid orifice 192 that fluidly connects the chamber 174 and cylinder bore 176, and facilitates the flow of the fluid between the chamber 174 and the cylindrical bore 176. The fluid orifices 190, 192 open and close during the reciprocating movement of the piston 106 inside the bore 176. Further, it may be appreciated that the fluid moves out of the bore 176 through a hydraulic line connection 196 in response to the movement of the piston 106 towards the second lateral end 180. Further, as shown, an axis of the movement of the piston 106 is arranged substantially horizontally.

Moreover, to cover the chamber 174, the brake assembly 100 includes a diaphragm 200, a diaphragm support 202, a cover plate 204 arranged covering the chamber 174 from top. The diaphragm is arranged between the diaphragm support and the wall of the reservoir body 104, and while the diaphragm support 202 is arranged between cover plate and the diaphragm 200. The diaphragm, the diaphragm support 202, and the cover plate 204 are secured to each other and the reservoir body 104 via the cover plate machine screw 206. Also, the reservoir body 104 includes a viewing window 210 to enable a user to view a level of the brake fluid inside the chamber 174.

Figure 5:
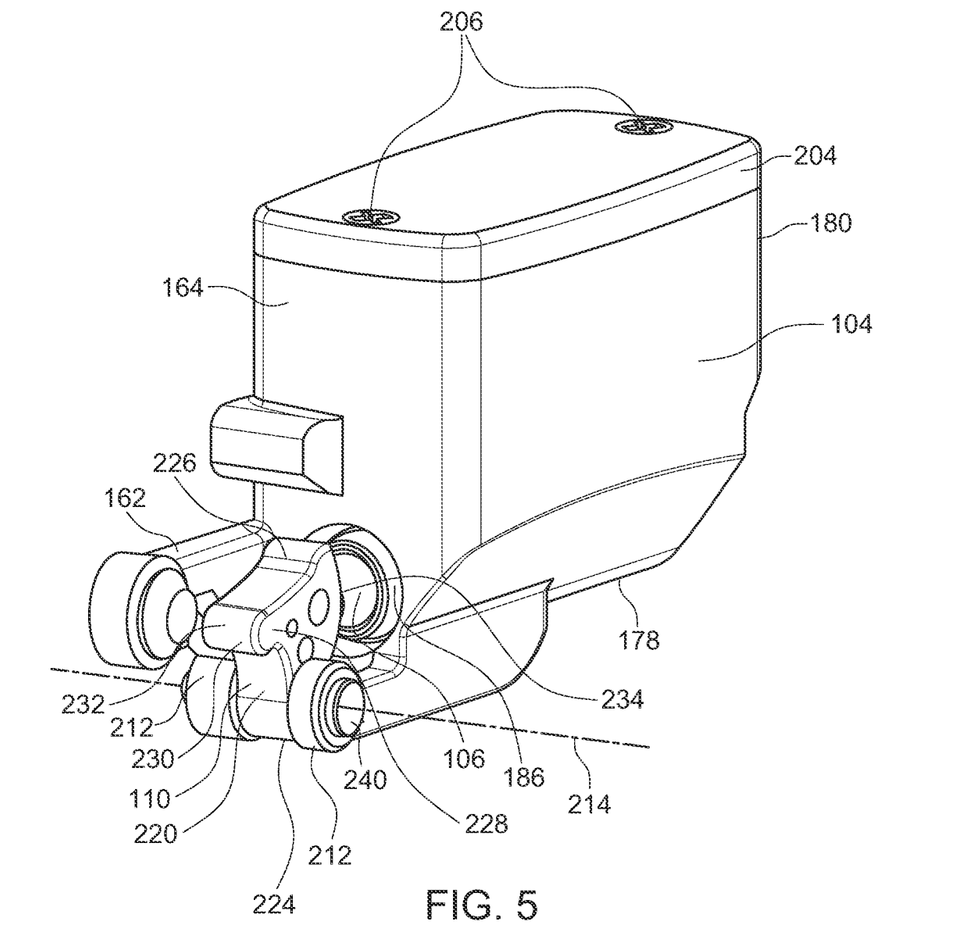
FIG. 5 illustrates an isometric rear view of the reservoir body and the driver link pivotally connected to the reservoir body, according to an embodiment of the disclosure.
Figure 6:
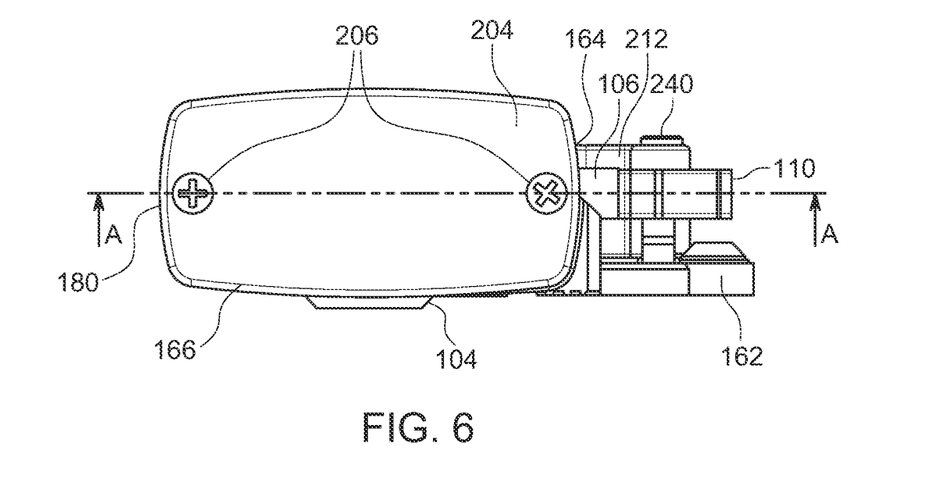
FIG. 6 illustrates a top view of the reservoir body and the drive link connected to the reservoir body, according to an embodiment of the disclosure.
Figure 7:
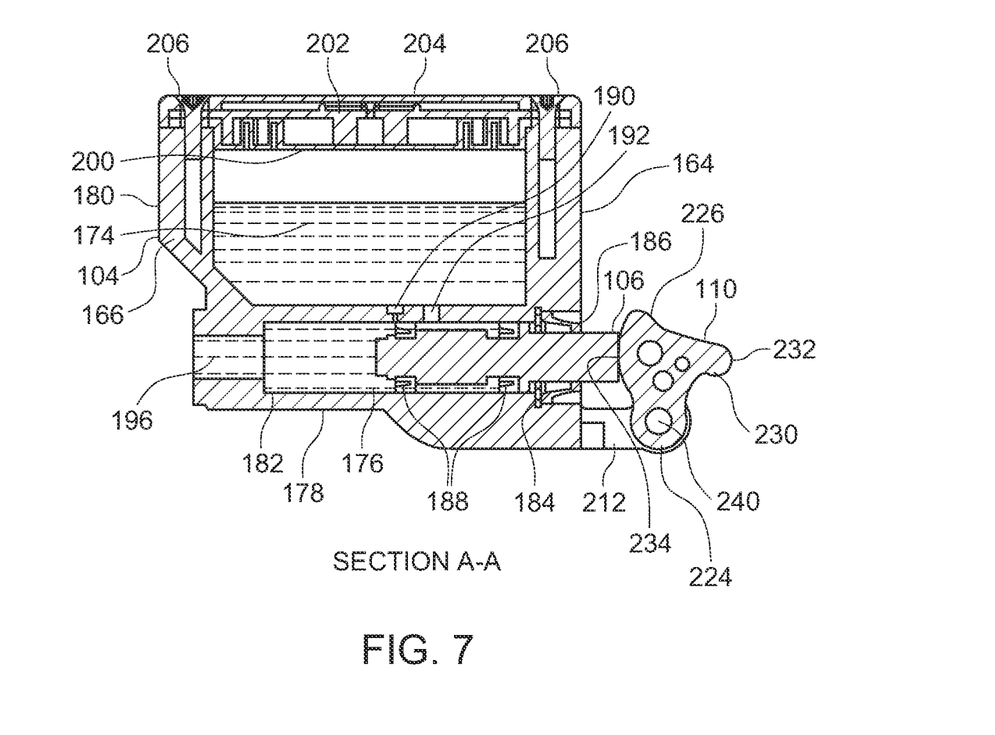
FIG. 7 illustrates a sectional view of the reservoir body and the drive link along line A-A of the FIG. 6, according to an embodiment of the disclosure.

Referring to FIGS. 1 and 5, the reservoir body 104 includes a pair of brackets 212 extending outwardly and away from the first lateral end 164 of the reservoir body 104, and are connected to the wall 166 of the reservoir body 104. A direction of extension of the brackets 212 is similar to the extension arm 162 of the reservoir body 104, and may be arranged downwardly of the extension arm 16. The pair of brackets 212 enables a pivotal connection of the drive link 110 with the reservoir body 104. A pivot axis 214 of the drive link 110 extends substantially perpendicularly to the direction of reciprocation of piston 106.

The drive link 110 includes a vertically extending body portion 220 having a first longitudinal end 224 (i.e., bottom end 224) and a second longitudinal end 226 (i.e., upper end 226), and an arm portion 228 arranged proximate to the upped end 226 and extending in a lateral direction from the body portion 220. As shown, in an assembly of the drive link 110 with the brackets 212, the arm portion 228 extends in a direction away from the reservoir body 104 (i.e., the first lateral end 164). To enable a smooth engagement of the handle 102 with the arm portion 228 throughout the rotational/angular positions of the handle 102 relative to the reservoir body 104, the drive link 110 defines a round surface 230 extending from a free end 232 of the arm portion 228 towards the bottom end 224 of the body portion 220. Similarly, the body portion 220 includes a convex surface 234 arranged opposite to the arm portion 228 and having an apex arranged proximate to the upper end 226 relative to the bottom end 224 to ensure a contact of the drive link 110 with the piston 106 at all angular positions of the handle 102 relative to the reservoir body 104. Moreover, the drive link 110 is pivotally connected to the pair of brackets 212 at a location proximate to the bottom end 224 via a clevis pin 240 which is retained in position and with the drive link 110 by a clevis pin C clip 242. Accordingly, the handle 102 contacts the drive link 110 at all of the angular position of the handle 102, and thereby facilitates the advancement of the piston 106 inside the cylindrical bore 176 when the handle 102 is pressed by a user.

Figure 3:
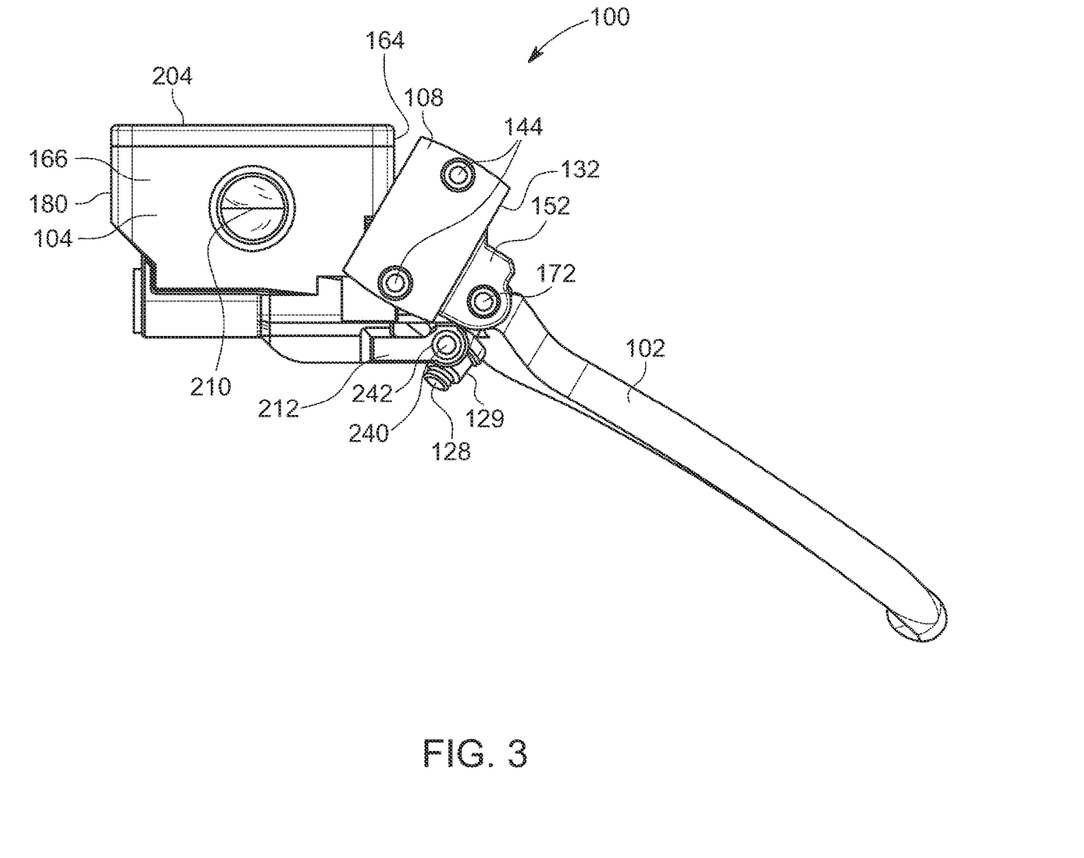
FIG. 3 illustrates a front view of the brake assembly with the handle and a base bracket arranged at an angular position relative to the reservoir body, according to an embodiment of the disclosure.
Figure 4:
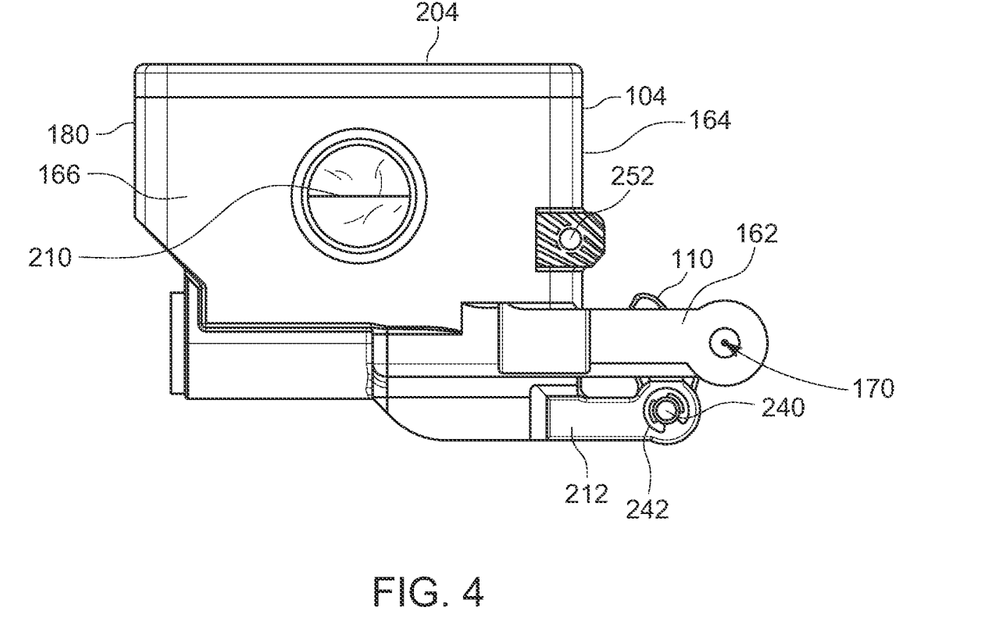
FIG. 4 illustrates a front view of the reservoir body and a driver link pivotally connected to the reservoir body, according to an embodiment of the disclosure.

To faciletct the rotation/pivoting of the handle 102 (i.e., base bracket 130) relative to reservoir body 104, and to secure the handle 102 relative to the reservoir body 104 at any of the angular positions, the base bracket 130 defines an arcuate slot 250 extending in a longitudinal direction and arranged proximate to the second lateral end 180 of the reservoir body 104. The arcuate slot 250 enables the securing of the base bracket 130 (i.e., the handle 102) at various angular position relative to the reservoir body 104. Further, to secure the base bracket 130 with the reservoir body 104 at the selected angular position, the reservoir body 104 includes a mating groove 252, and a screw 254 extends through the arcuate slot 250 and inside the mating groove 252.

To set the base bracket 130 and hence the handle 102 at a different angular position relative to the reservoir body 104, the cover bracket 132 is removed from the base bracket 130, the screw 254 and the screw 172 is loosened, and the base bracket 130 along with the handle 102 is rotated/pivoted about the axis 160 relative to the reservoir body 104, and is accordingly positioned at the desired angular orientation relative to the handlebar. Thereafter, the screw 254 is tightened to secure/set the base bracket 130, and hence the handle 102 at the desired angular position relative to the reservoir body 104. Subsequently, the cover bracket 132 is mounted to the base bracket 130 with the handlebar extending through the handlebar slot 142.

In this manner, only the handle 102 and the bracket assembly 108 rotates with respect to the handlebar without changing the position of the reservoir body 104, keeping the reservoir body vertically oriented such that the brake fluid inside the reservoir body 104 remains level with the ground when the vehicle is in an upright position.

Figure 9:
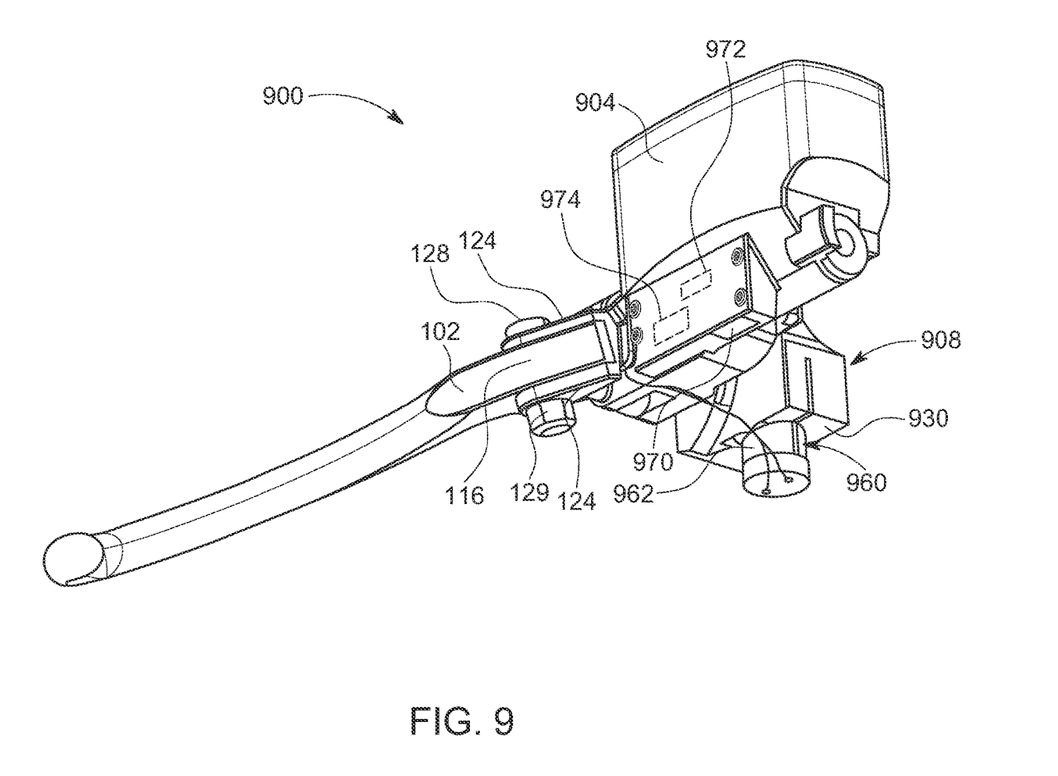
FIG. 9 illustrates a rear isometric view of a brake assembly, according to an embodiment of the disclosure.
Figure 10:
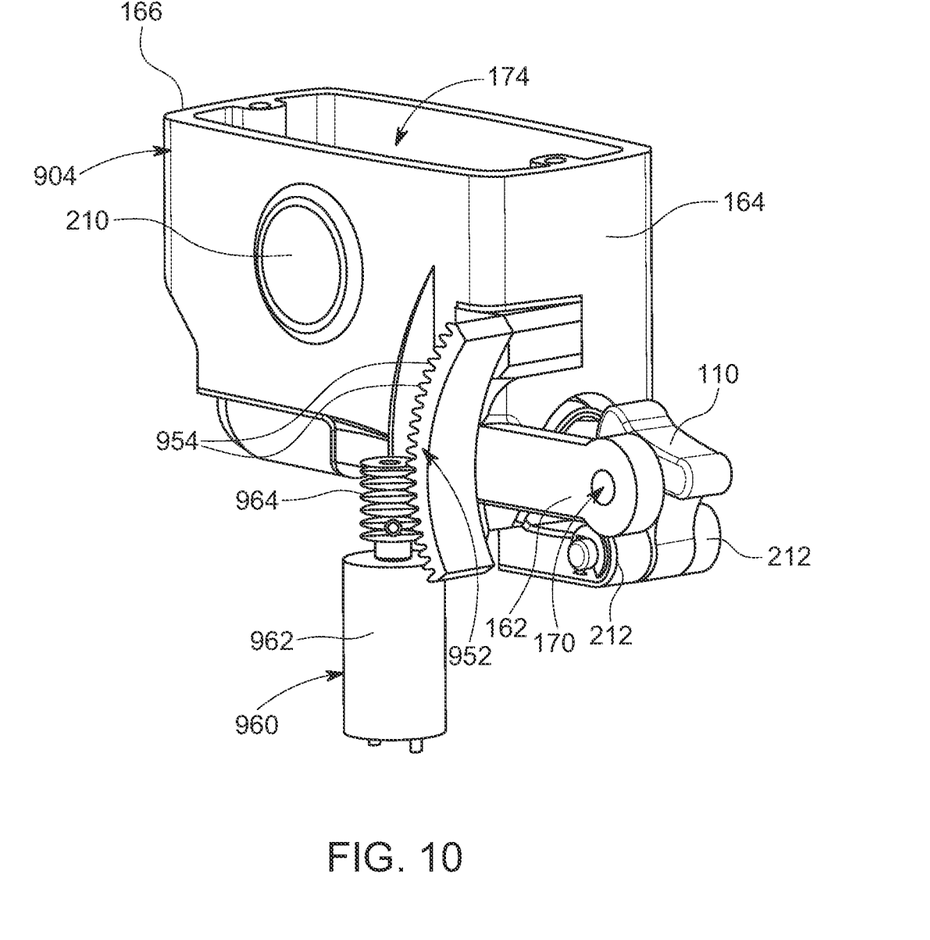
FIG. 10 illustrates an isometric view of the brake assembly of FIG. 9 with a bracket assembly removed and depicting a gear wheel portion of a reservoir body engaged with a worm gear mounted to a motor, according to an embodiment of the disclosure.
Figure 11:
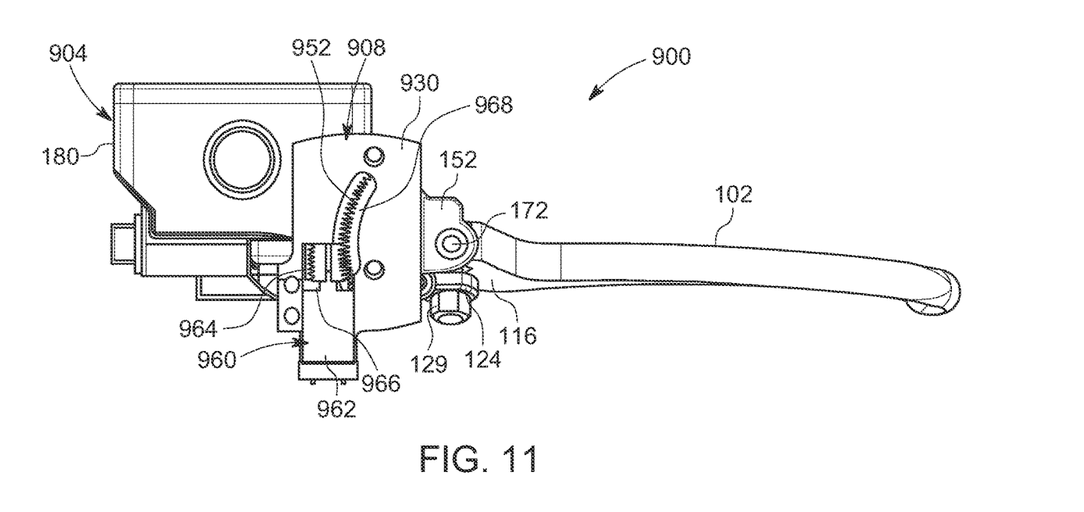
FIG. 11 illustrates a front view of the brake assembly of FIG. 9 with a portion of a base bracket of the bracket assembly removed and depicting the gear wheel portion arranged inside a curved recess of the base bracket and the motor with the worm gear arranged inside a mounting cavity of the base bracket and engaged with the gear wheel portion, according to an embodiment of the disclosure.

Referring to FIGS. 9 to 11, a brake assembly 900 according to an alternative embodiment is shown. The brake assembly 900 is similar to the brake assembly 100 except that a bracket assembly 908 and a reservoir body 904 of the brake assembly 900 is different from the bracket assembly 108 and the reservoir body 104 of the brake assembly. The reservoir body 904 is different from the reservoir body 904 in the aspect that the reservoir body includes a gear wheel portion 952 extending in a longitudinal direction and having gear teeth 954. Further, the bracket assembly 908 is different from the bracket assembly 108 in the aspect the arcuate slot 250 is omitted from a base bracket 930 of the bracket assembly 908.

Further, the brake assembly 900 includes an actuator 960 having a motor 962 and a worm gear 964 attached to a shaft of the motor 964 and arranged in engagement with the gear wheel portion 952. As shown, the actuator 960 is mounted to the base bracket 930 and to facilitate the mounting of the actuator 960 with the base bracket 930, the base bracket defines a mounting cavity 966. Further, to enable the engagement of the worm gear 964 with the gear teeth 954 of the gear wheel portion 952, the base bracket defines a curved recess 968. In the assembly of the base bracket 930 with the reservoir body 904, the gear wheel portion 952 extends inside the curved recess 968 and engages with worm gear 964. Although the gear wheel portion 952 and the actuator 960 are shown and contemplated to be mounted to the reservoir body 904 and the base bracket 930, respectively, it may be envisioned that the gear wheel portion 952 may be mounted to the reservoir body 904 and the actuator 960 may be mounted to the base bracket 930.

To rotate the handle 102 and hence the base bracket 930 about the axis 160, a user may first remove the cover bracket 132 from the base bracket 930, and then loosen the screw 172. Thereafter, the user may hold the reservoir body 904 to keep the orientation of the reservoir body 904 fixed relative to the handlebar, and actuates the actuator 960. In response to the rotation of the motor 962 and hence the worm gear 964, the base bracket 930 rotates/pivots about the axis 160 relative to the reservoir body 904, causing a change in angular position of the handle 102 relative to the handlebar. After orienting the handle 102 at the desired orientation relative to the handlebar, the user fixes the cover bracket 132 with the base bracket 930, thereby fixing the position of the handle 102 relative to the handlebar.

In an embodiment, to actuate the actuator 960, the brake assembly 100 may include a switch 970. In an embodiment, the motor 962 is a bidirectional motor and is configured to rotate in a first direction and a second direction opposite to the first direction to enable a rotation of the worm gear 964 in a first direction and a second direction, respectively.

To enable the rotation of the motor 962 in the first direction or the second direction, the switch 970 may be a 3-position toggle switch. The motor 962 remains switched off when the switch 970 is arranged at a first position (i.e., center position), while in motor 962 rotates in the first direction when the switch 970 is moved to a second position. The motor 962 rotates in the second direction in response to the movement of the switch 970 to a third position. In an embodiment, the brake assembly 100 also includes a controller 972 arranged in communication with the motor 962 and the switch 970, and controls the rotation of the motor 962 based on the position of the switch 970. Further, to power the motor 962 and the controller 972, the brake assembly 100 may include a battery 976.

The embodiments provide for several advantages over the prior art. For example, the brake assembly 100, 900 allows for changing the angular positions of the handle 102 without changing the vertical orientation of the reservoir body 104, 904 relative to a ground. Accordingly, by allowing to adjust the relative angular position of the base bracket 130, 930 and the reservoir body 104, 904, the reservoir body 104, 904 can be mounted to the handlebar of the vehicle such that the reservoir body 104, 904 extends vertically from the ground so that the brake fluid is level with the ground when the motorcycle is in the upright position. Accordingly, brake assembly 100, 900 prevents the air from entering the cylindrical bore 176 due to the change in angular positioning of the handle 102 or the handlebar.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A brake assembly adapted to be mounted to a handlebar of a vehicle, the brake assembly comprising:
   a reservoir body adapted to store a brake fluid and defines a cylindrical bore;
   a piston adapted to reciprocate inside the cylindrical bore;
   a base bracket pivotably coupled to the reservoir body and adapted to be mounted to the handlebar;
   a handle pivotally coupled to the base bracket and adapted to pivot relative to the base bracket; and
   a drive link pivotably coupled to the reservoir body and configured to pivot relative to the reservoir body to advance the piston inside the cylindrical bore in response to the pressing of the handle,
      wherein the handle is configured to be set at a plurality of angular positions with respect to the reservoir body by pivoting the base bracket relative to the reservoir body; and wherein the base bracket includes an arcuate slot to facilitate the setting of the handle at the plurality of angular positions.

2. The brake assembly of claim 1, wherein the reservoir body defines a mating groove and the brake assembly includes a screw extending inside the mating groove through the arcuate slot to set the handle at one of the plurality of angular positions.

3. The brake assembly of claim 1, wherein
the reservoir body includes a gear wheel portion having a plurality of teeth; and,
the brake assembly includes an actuator mounted to the base bracket and having a worm gear engaged with the gear wheel portion to facilitate the pivoting of the base bracket relative to the reservoir body to set the handle the plurality of angular positions.

4. The brake assembly of claim 3, wherein the actuator includes a motor, and the worm gear is connected to the motor and rotates in response to an actuation of the motor to facilitate the setting of the handle in any of the plurality of angular positions relative to the reservoir body.

5. The brake assembly of claim 1, wherein
the reservoir body includes an extension arm; and,
the base bracket includes an arm pivotally coupled to the extension arm.

6. The brake assembly of claim 1, wherein the drive link includes
a convex surface adapted to contact the piston; and,
a round surface arranged opposite to the convex surface and adapted to contact the handle,
wherein the convex surface and the round surface together facilitate the advancement of the piston inside the cylindrical bore in response to the pressing of the handle at any of the plurality of angular positions of the handle relative to the reservoir body.

7. The brake assembly of claim 1, wherein the reservoir body includes a pair of brackets extending outwardly of a first lateral end of the reservoir body, wherein the drive link is arranged between the pair of brackets and is pivotally coupled to the pair of brackets.

8. The brake assembly of claim 7, wherein the drive link includes
a vertically extending body portion having a first longitudinal end and a second longitudinal end; and,
an arm portion extending from the body portion and arranged proximate to the second longitudinal end of the body,
wherein the handle is adapted to contact the arm and the first longitudinal end is pivotally coupled to the pair of brackets.

9. The brake assembly of claim 1, wherein the handle is configured to advance the drive link in each of the plurality of angular positions of the handle relative to the reservoir body.

10. The brake assembly of claim 1 further including a cover bracket adapted to engage with the base bracket to facilitate the mounting of the base bracket to the handlebar.

11. The brake assembly claim 10, wherein the base bracket and the cover bracket together define a handlebar slot, wherein the handlebar extends through the handlebar slot in the engagement of the brake assembly with the handlebar.

12. A brake assembly adapted to be mounted to a handlebar of a vehicle, the brake assembly comprising:
a reservoir body adapted to store a brake fluid and defines a cylindrical bore;
a piston adapted to reciprocate inside the cylindrical bore;
a base bracket pivotably coupled to the reservoir body and adapted to be mounted to the handlebar;
a handle pivotally coupled to the base bracket and adapted to pivot relative to the base bracket; and
a drive link pivotably coupled to the reservoir body and configured to pivot relative to the reservoir body to advance the piston inside the cylindrical bore in response to the pressing of the handle,
wherein the handle is configured to be set at a plurality of angular positions with respect to the reservoir body by pivoting the base bracket relative to the reservoir body;
wherein the reservoir body includes a gear wheel portion having a plurality of teeth; and
wherein the brake assembly includes an actuator mounted to the base bracket and having a worm gear engaged with the gear wheel portion to facilitate the pivoting of the base bracket relative to the reservoir body to set the handle the plurality of angular positions.

\* \* \* \* \*